United States Patent [19]

Usubuchi et al.

[11] Patent Number: 5,177,171

[45] Date of Patent: Jan. 5, 1993

[54] SULFONIC ACID GROUP-CONTAINING POLYURETHANE AND A PHOTOSENSITIVE RESIN COMPOSITION CONTAINING THE SAME

[75] Inventors: Yutaka Usubuchi; Takeshi Oguri; Katsuya Nakano, all of Fuji, Japan

[73] Assignee: Asahi Kasei Kogyo Kabushiki Kaisha, Osaka, Japan

[21] Appl. No.: 579,955

[22] Filed: Sep. 10, 1990

[30] Foreign Application Priority Data

Sep. 14, 1989 [JP] Japan .................. 1-237178

[51] Int. Cl.⁵ .................. C08G 18/30; C08G 18/42; C08G 18/68
[52] U.S. Cl. .................. 528/83; 528/81; 528/85; 430/281; 430/287; 430/288
[58] Field of Search .................. 528/83, 81, 85; 430/287, 288, 281

[56] References Cited

U.S. PATENT DOCUMENTS

| 4,224,418 | 9/1980 | Dieterich et al. ............. 528/83 |
| 4,394,435 | 7/1983 | Farber et al. ............. 430/287 |
| 5,053,316 | 10/1990 | Suzuki et al. ............. 430/281 |

FOREIGN PATENT DOCUMENTS

| 0085722 | 8/1983 | European Pat. Off. . |
| 0146326 | 4/1987 | European Pat. Off. . |
| 48-42049 | 6/1973 | Japan . |
| 48-68302 | 9/1973 | Japan . |
| 49-43565 | 11/1974 | Japan . |
| 50-7605 | 1/1975 | Japan . |
| 50-78401 | 6/1975 | Japan . |
| 48-72250 | 9/1978 | Japan . |
| 57-4891 | 1/1982 | Japan . |
| 57-18173 | 4/1982 | Japan . |
| 58-33884 | 7/1983 | Japan . |
| 58-117537 | 7/1983 | Japan . |
| 59-6210 | 1/1984 | Japan . |
| 59-80424 | 5/1984 | Japan . |
| 59-29849 | 7/1984 | Japan . |
| 59-221327 | 12/1984 | Japan . |
| 60-8322 | 1/1985 | Japan . |
| 60-14232 | 1/1985 | Japan . |
| 61-162524 | 7/1986 | Japan . |
| 2-372 | 1/1990 | Japan . |
| 1483687 | 8/1977 | United Kingdom . |

*Primary Examiner*—Morton Foelak
*Assistant Examiner*—D. Truong
*Attorney, Agent, or Firm*—Birch, Stewart, Kolasch & Birch

[57] ABSTRACT

A sulfonic acid group-containing polyurethane produced from a sulfonic acid group-containing polyamide diol and/or a sulfonic acid group containing polyester diol, a dihydroxyhydrocarbon having a specific molecular weight and a diisocyanate. This polyurethane has not only high hydrophilicity but also excellent mechanical strength, excellent heat resistance, low permanent tensile set and low hardness, which are required for the base polymer for a photosensitive resin composition to be used for producing a flexographic printing plate. Further, a photosensitive resin composition containing such a sulfonic acid group-containing polyurethane has excellent photosensitivity and in addition, has excellent properties such that after the photosensitive resin composition has been exposed to actinic rays through an image-bearing transparency, the development of the exposed composition can be performed with water or an aqueous alkali solution. From this photosensitive resin composition, a flexographic printing plate having excellent printing resistance, ink resistance and mechanical properties can be obtained.

14 Claims, No Drawings

SULFONIC ACID GROUP-CONTAINING POLYURETHANE AND A PHOTOSENSITIVE RESIN COMPOSITION CONTAINING THE SAME

BACKGROUND OF THE INVENTION

1. Field Of The Invention

The present invention relates to a sulfonic acid group-containing polyurethane and a photosensitive resin composition containing the same. More particularly, the present invention is concerned with a sulfonic acid group-containing polyurethane produced from a sulfonic acid group-containing polyamide diol and/or a sulfonic acid group containing polyester diol, a dihydroxyhydrocarbon having a specific molecular weight and a diisocyanate. Further, the present invention is concerned with a photosensitive resin composition comprising such a sulfonic acid group-containing polyurethane as a base polymer, an ethylenically unsaturated compound and a photopolymerization initiator.

The sulfonic acid group-containing polyurethane of the present invention has not only high hydrophilicity but also excellent mechanical strength, excellent heat resistance, low permanent tensile set and low hardness, which are required for the base polymer for a photosensitive resin composition to be used for producing a flexographic printing plate, and has also excellent compatibility with an ethylenically unsaturated compound. The photosensitive resin composition containing such a sulfonic acid group-containing polyurethane has excellent photosensitivity and, in addition, has excellent properties such that, after the photosensitive resin composition has been exposed to actinic rays through an image-bearing transparency, the development of the exposed composition can be performed with water or an aqueous alkali solution optionally containing a surfactant, thereby producing a flexographic printing plate which has excellent printing resistance, ink resistance and mechanical properties

2. Discussion Of Related Art

Various types of polymers are known as a base polymer of a photosensitive resin composition which is used to produce a printing plate. In particular, polyamides are widely used as such a base polymer. Conventionally, an alcohol-soluble polyamide copolymer was mainly used. However, the production of a printing plate using this alcohol-soluble polyamide copolymer is inevitably accompanied by drawbacks, such as limitations in handling and operation attributed to the use of an alcohol and the necessity of an anti-fire developer apparatus. Therefore, currently, as polyamides for use in preparing a photosensitive resin composition, use is made of those which can provide a photosensitive resin composition which, after being exposed to actinic rays, can be developed with water or an aqueous alkali solution.

Representative examples of such polyamides include a sulfonic acid group-containing polyamide as disclosed in Japanese Patent Application Laid-Open Specification Nos. 48-68302/1973 and 48-72250/1973, a polyamide containing a basic nitrogen or an ammonium salt-forming nitrogen as disclosed in Japanese Patent Application Laid-Open Specification Nos. 50-7605/1975 and 50-78401/1975 and a polyamide having an ether bond as disclosed in Japanese Patent Application Laid-Open Specification No. 48-42049/1973 and Japanese Patent Application Publication Specification No. 49-43565/1974.

The printing plates produced from a photosensitive resin composition containing such a polyamide, however, has poor resistance to flexographic printing ink (in which water or an alcohol is used as a solvent).

A thermoplastic elastomer is also used as a base polymer for a photosensitive resin composition which is useful in producing a flexographic printing plate. As such thermoplastic elastomers, use is currently made of those which, after being exposed to actinic rays, can be developed only with organic solvents, such as ketones and chlorinated hydrocarbons. The use of such organic solvents are likely to cause a pollution problem. Therefore, efforts are made in the art to develop a photosensitive resin composition comprising a thermoplastic elastomer, which composition, after being exposed to actinic rays, can be developed with water or an aqueous solution. Examples of such photosensitive resin compositions are disclosed in for example, Japanese Patent Application Publication Specification Nos. 59-29849/1984 and 58-33884/1983. From any of the proposed photosensitive resin compositions, however, only printing plates having poor ink resistance can be obtained, which limits their application in industry.

Further, a polyamide copolymer comprising a polyamide as a main chain and, incorporated therein, a polyether segment, was proposed as a base polymer for a photosensitive resin composition which can give a flexible, tough flexographic printing plate by exposure to actinic rays and development with water or an aqueous solution. Representative examples of such copolymerized polyamides include a polyamide copolymer as produced from a polyoxyethylene having terminal amino or carboxyl groups and an aliphatic dicarboxylic acid or an aliphatic diamine (see Japanese Patent application Publication Specification Nos. 57-18173/1982 and 57-4891/1982), and a polyether-ester-amide as produced from a lactam or a nylon salt, a polyoxyalkylene glycol and a dicarboxylic acid (see Japanese Patent Application Laid-Open Specification Nos. 58-117537/1983 and 60-14232/1985). Still further, a polyether-ester-amide as produced from a sulfonic acid group-containing polyamide, a polyoxyalkylene glycol and a dicarboxylic acid (see Japanese Patent Application Laid-Open Specification Nos. 60-8322/1985 and 61-162524/1986) and a polyether-ester-amide as produced from a polyamide having a basic nitrogen, a polyoxyalkylene glycol and a dicarboxylic acid (Japanese Patent Application Laid-Open Specification No. 59-221327/1984 and Japanese Patent Application Publication Specification No. 2-372/1990) were proposed as a base polymer for a photosensitive resin composition which is excellent in developability with water or an aqueous solution after exposure to actinic rays. However, from such polyamide copolymers, only a flexographic printing plate having poor resistance to flexographic printing ink is obtained.

Known as a base polymer for a synthetic leather, a coating composition and an adhesive composition is a polyether-ester-urethane as produced from a sulfonic acid group-containing polyester diol, a polyoxyalkylene glycol and a diisocyanate (see Japanese Patent Application Laid-Open Specification Nos. 59-6210/1984 and 59-24/1984). When this polyether-ester-urethane is used as a base polymer for a photosensitive resin composition and the composition is exposed to actinic rays and developed, the resultant printing plate has poor resistance to flexographic printing ink.

SUMMARY OF THE INVENTION

The present inventors have made extensive and intensive studies with a view toward developing a polyurethane that can be used as the base polymer for forming a photosensitive resin composition which, after being exposed to actinic rays, can be developed with water or an aqueous alkali solution to obtain a flexographic printing plate having excellent printing resistance, flexographic printing ink resistance and mechanical properties. As a result, the present inventors have unexpectedly found that the desired polyurethane can be produced from a sulfonic acid group-containing polyamide diol and/or a sulfonic acid group-containing polyester diol, a dihydroxyhydrocarbon having a specific molecular weight and a diisocyanate, and that the desired photosensitive resin composition can be obtained by combining the polyurethane with an ethylenically unsaturated compound and a photopolymerization initiator. Based on these findings, the present invention has been completed.

It is, accordingly, an object of the present invention to provide a polyurethane having not only high hydrophilicity but also excellent mechanical properties, excellent heat resistance, low permanent tensile set and low hardness, which are required for the base polymer for a photosensitive resin composition to be used for producing a flexographic printing plate, and also having excellent compatibility with an ethylenically unsaturated compound.

It is another object of the present invention to provide a photosensitive resin composition containing the above-mentioned polyurethane, which composition has not only excellent photosensitivity but is also developable, after exposure to actinic rays, with water or an aqueous solution and which is useful for producing a flexographic printing plate having excellent printing resistance, flexographic printing ink resistance and mechanical properties.

The foregoing and other objects, features and advantages of the present invention will be apparent from the following detailed description and appended claims.

DETAILED DESCRIPTION OF THE INVENTION

In one aspect of the present invention, there is provided a sulfonic acid group-containing polyurethane produced from:

(a) at least one diol selected from the group consisting of a sulfonic acid group-containing polyamide diol and a sulfonic acid group-containing polyester diol;

(b) a dihydroxyhydrocarbon having a number average molecular weight of from 400 to 4,000; and (c) a diisocyanate.

Any sulfonic acid group-containing polyamide diol can be used as diol (a) for producing the sulfonic acid group-containing polyurethane according to the present invention. Representative examples of sulfonic acid group-containing polyamide diols include a polyamide diol which is obtained by reacting a polyamide having terminal carboxyl groups, as produced from (1) a polyamide-forming monomer and (2) a dicarboxylic acid or a derivative thereof, with (3) at least one diol selected from the group consisting of an alkylene glycol having 2 to 4 carbon atoms and a polyoxyalkylene glycol having a number average molecular weight of less than 400, a portion or the whole of reactants (1) and (2) containing a sulfonic acid group in the molecule thereof.

Representative examples of polyamide-forming monomers include an aminocarboxylic acid or a lactam having at least 6 carbon atoms and an equimolar salt of a dicarboxylic acid and a diamine, which salt has at least 6 carbon atoms. Examples of such aminocarboxylic acids are ω-aminocaproic acid, 11-aminoundecanoic acid and 12-aminododecanoic acid, and examples of such lactams are caprolactam and laurolactam. Further, examples of such equimolar salts are hexamethylenediammonium adipate, hexamethylenediammonium sebacate, hexamethylenediammonium isophthalate, undecamethylenediammonium adipate, undecamethylenediammonium 1,4-cyclohexanedicarboxylate, and undecamethylenediammonium isophthalate. The above-mentioned polyamide-forming monomers may be used individually or in combination.

Further, any sulfonic acid group-containing polyester diol can be used as diol (a) for producing the sulfonic acid group-containing polyurethane according to the present invention. Representative examples of sulfonic acid group-containing polyester diols include a polyester diol produced from (2) a dicarboxylic acid or a derivative thereof and (3) at least one diol selected from the group consisting of an alkylene glycol having 2 to 4 carbon atoms and a polyoxyalkylene glycol having a number average molecular weight of less than 400, a portion or the entire amount of reactant (2) containing a sulfonic acid group in the molecule thereof.

Representative examples of dicarboxylic acid derivatives (2) having a sulfonic acid group in the molecule thereof which are used in the production of the sulfonic acid group-containing polyurethane of the present invention, include sodium 2,5- or 3,5-dicarboxybenzenesulfonate, sodium 2,5- or 3,5-dicarboxymethylbenzenesulfonate, sodium 2,5- or 3,5-dicarbomethoxybenzenesulfonate, sodium 2,5- or 3,5-dicarbomethoxymethylbenzenesulfonate, α-sodiumsulfosuccinic acid, dimethyl ester thereof, β-sodiumsulfoadipic acid and dimethyl ester thereof.

The sulfonic acid group may be either in a free acid form or in the form of an alkali metal or alkaline metal salt thereof.

The sulfonic acid group is preferably present in the sulfonic acid group-containing polyurethane in an amount of at least 0.05, more preferably from 0.1 to 2, in terms of the number of sulfonic acid groups per 1,000 of the number average molecular weight of the polyurethane. When the amount of the sulfonic acid group is less than 0.1, the hydrophilicity of the polyurethane is likely to be unsatisfactory, thereby adversely affecting the developability with water or an aqueous alkali solution of a photosensitive resin composition containing the polyurethane. On the other hand, when the amount of the sulfonic acid group is more than 2, the mechanical properties of the polyurethane are likely to be unsatisfactory.

Dihydroxyhydrocarbon (b) has a number average molecular weight of from 400 to 4,000, as measured by a hydroxyl value determination method using a solution composed of acetic anhydride and pyridine. Representative examples of dihydroxyhydrocarbons include compounds obtained by introducing hydroxyl groups into terminal groups of a homopolymer of an olefin or a diolefin or a copolymer of an olefin or a diolefin with a comonomer and a hydrogenation product of the above-mentioned compound. The dihydroxyhydrocarbon has from 1.5 to 2.5 hydroxyl groups per molecule thereof on the average.

These dihydroxyhydrocarbons can be individually or in combination.

The dihydroxyhydrocarbons can also be used in combination with polyethylene glycol in order to further improve the developability with water or an aqueous solution of a photosensitive resin composition containing the resultant polyurethane. The proportion of polyethylene glycol to the dihydroxyhydrocarbon is selected so as not to adversely affect the flexographic printing ink resistance of the ultimate printing plate. Generally, polyethylene glycol may be used in an amount of not greater than 30% by weight, based on the weight of dihydroxyhydrocarbon (b).

When the number average molecular weight of the dihydroxyhydrocarbon is smaller than 400, the ultimate printing plate has poor elasticity and flexibility. On the other hand, when the number average molecular weight of the dihydroxyhydrocarbon exceeds 4,000, the final polyurethane has poor mechanical properties. It is preferred that the number average molecular weight of the dihydroxyhydrocarbon be in the range of from 1,000 to 3,500.

It is believed that the dihydroxyhydrocarbon forms a soft segment in the molecule of the final polyurethane, which segment contributes toward the rubber elasticity of the final polyurethane and the flexographic printing ink resistance of the ultimate printing plate.

It is preferred that the weight ratio of diol (a) to dihydroxyhydrocarbon (b) be in the range of from 1/20 to 2/1. When the weight ratio is greater than 2/1, the melting temperature of the resultant polyurethane is likely to become high, so that not only does the final photosensitive resin composition become difficult to be molded but also the ultimate printing plate has a poor flexibility. On the other hand, when the weight ratio is smaller than 1/20, the mechanical strength of the resultant polyurethane is likely to become low, so that the obtained polyurethane cannot be used as a base polymer for a photosensitive resin composition useful for preparing a flexographic printing plate. The weight ratio of diol (a) to dihydroxyhydrocarbon (b) is more preferably in the range of from 1/10 to 1/1.

Diisocyanate (c) to be used in the production of the sulfonic acid group-containing polyurethane of the present invention may have either free isocyanate groups or isocyanate groups protected by a protecting group.

Representative examples of diisocyanates having free isocyanate groups include tolylene diisocyanate, diphenylmethane-4,4'-diisocyanate, hexamethylene diisocyanate, naphthylene-1,5-diisocyanate, xylylene diisocyanate, isophorone diisocyanate, dicyclohexylisocyanate and hydrogenated xylylene diisocyanate. Representative examples of diisocyanates having protected isocyanate groups include diisocyanates obtained by protecting the isocyanate groups of the above diisocyanates with a lactam, a phenol or a lower alcohol. Of such diisocyanates, the diisocyanates protected with caprolactam are preferred. The diisocyanates may be used individually or in combination.

It is preferred that the molar ratio of the isocyanate groups of diisocyanate (c) to the sum of the hydroxyl groups of diol (a) and dihydroxyhydrocarbon (b) (hereinafter referred to simply as "NCO/OH ratio") be in the range of from 0.6 to 1.3.

By the reaction of diol (a), dihydroxyhydrocarbon (b) and diisocyanate (c) at the above-mentioned NCO/OH ratio, a polyurethane can be effectively obtained, which has not only high hydrophilicity but also excellent mechanical strength, excellent heat resistance, low permanent tensile set and low hardness, which are required for base polymer for a photosensitive resin composition to be used for producing a flexographic printing plate, and has also excellent compatibility with an ethylenically unsaturated compound.

When the above-mentioned NCO/OH ratio is less than 0.6, the resultant polyurethane is likely to have unsatisfactory mechanical strength and elasticity. On the other hand, when the NCO/OH ratio exceeds 1.30, the resultant polyurethane is likely to have a large ratio of crosslinking at urethane linkages due to the presence of excess diisocyanate. When such a polyurethane is mixed with an ethylenically unsaturated compound and a photopolymerization initiator, the resultant photosensitive resin composition is likely to have poor uniformity. From the viewpoints of ensuring excellent mechanical properties for the polyurethane and excellent uniformity for the photosensitive resin composition, it is more preferred that the NCO/OH ratio be in the range of from 0.70 to 1.10.

In producing the sulfonic acid group-containing polyurethane of the present invention, (a) at least one diol selected from the group consisting of a sulfonic acid group-containing polyamide diol and a sulfonic acid group-containing polyester diol (b) a dihydroxyhydrocarbon and (c) a diisocyanate as described above may be mixed together and heated at a temperature which is preferably in the range of from 120° to 270° C. When the temperature is lower than 120° C., melting of the sulfonic acid group-containing polyamide diol or the sulfonic acid group-containing polyester diol is likely to be difficult. Further, even when these diols are melted, the melt viscosity of the reaction mixture would become disadvantageously so high that the stirring of the reaction mixture becomes difficult, before forming a polyurethane having satisfactory properties. On the other hand, when the temperature is higher than 270° C., an urethane linkage is likely to be decomposed so that not only is the controlling of the polymerization of the polyurethane likely to be difficult but also the thermal degradation of the polyurethane is likely to occur.

In order to advance the polyurethane-forming reaction smoothly, it is preferred that water be removed from the sulfonic acid group-containing polyamide diol and/or the sulfonic acid group-containing polyester diol by distillation before the diisocyanate compound is reacted therewith.

In the reaction system for producing the polyurethane, a solvent may be used. With respect to the solvent, there is no particular limitation, as long as the solvent can dissolve or disperse therein the polyamide diol and/or the polyester diol, the dihydroxyhydrocarbon and the diisocyanate and as long as the solvent does not react with the diisocyanate. A highly polar solvent, an aromatic solvent, a high boiling point petroleum solvent and mixtures thereof may be used. Representative examples of solvents include N-methylpyrrolidone, dimethyl sulfoxide and dimethyl acylamide. The solvent is generally used in an amount such that the concentration of the polyurethane is in the range of from 5 to 80% by weight.

When the solvent is used, the reaction is preferably conducted at a temperature of from 20° C. to 150° C.

The polyurethane-forming reaction can be easily controlled by the use of the solvent.

If desired, conventional catalysts generally employed for forming the polyurethane, such as an amine catalyst and an organometal catalyst, can be used.

By the above-described polyurethane-forming reaction, polyamide-urethane and polyester-urethane can be obtained, that is, a sulfonic acid group-containing polyamide-urethane is obtained from the sulfonic acid group-containing polyamide-diol, and a sulfonic acid group-containing polyester-urethane is obtained from the sulfonic acid group-containing polyester diol. When a mixture of a sulfonic acid group-containing polyamide diol and a sulfonic acid group-containing polyester diol is used, a polyamide-ester-urethane is obtained. In the polyurethane, the segments derived from the polyamide diol and the segments derived from the polyester diol function as a hard segment. On the other hand, the segments derived from the dihydroxyhydrocarbon function as a soft segment. Therefore, a soft and tough elastomer having excellent elastomeric properties can be obtained. The sulfonic acid group-containing polyurethane of the present invention has not only excellent elastomeric properties but also thermoplasticity. The melt viscosity of the sulfonic acid group-containing polyurethane can be regulated by selecting the NCO-/OH ratio. Further, the polyurethane has excellent compatibility with an ethylenically unsaturated compound. Accordingly, the sulfonic acid group-containing polyurethane suitable as the base polymer for a photosensitive resin composition which is useful for producing a flexographic printing plate can be obtained.

The flexographic printing plate as produced from the above-mentioned photosensitive resin composition containing the sulfonic acid group-containing polyurethane as the base polymer has excellent printing resistance, flexographic printing ink resistance and mechanical properties. The flexographic printing ink resistance is evaluated in terms of the respective swelling ratios in water and isopropanol (which are solvents generally employed in the flexographic printing ink), the determination method of which will be described later. It is generally preferred that the swelling ratios be not greater than 20%, from the viewpoint of excellent printing quality. The swelling ratios of the flexographic printing plate as produced from the photosensitive resin composition of the present invention are not greater than 20%.

For increasing the stability of the sulfonic acid group-containing polyurethane, various types of stabilizers, such as a heat aging inhibitor and an antioxidant, may be added. The stabilizer may be added to the reaction mixture at any stage of polymerization, for example, the initial stage, the middle stage or the final stage of polymerization. The stabilizer may also be added to the reaction mixture after completion of the polymerization. Examples of stabilizers include hindered phenols, such as N,N'-hexamethylene-bis-(3,5-di-t-butyl-4-hydroxycinnamamide), 4,4'-bis-(2,6-di-t-butylphenol) and 2,2'-methylene-bis-(4-ethyl-6-t-butylphenol); aromatic amines, such as N,N'-bis(β-naphtyl)-p-phenylenediamine, N,N'-diphenyl-p-phenylenediamine and poly(2,2,4-trimethyl-1,2dihydroquinoline); copper salts, such as copper chloride and copper iodide; sulfur compounds, such as dilauryl thiodipropionate; phosphide; and the like. These stabilizers serve as a heat polymerization inhibitor or retarder or as a storage stabilizer for a photosensitive resin composition.

In another aspect of the present invention, there is provided a photosensitive resin composition comprising:

(A) a sulfonic acid group-containing polyurethane produced from:
(a) at least one diol selected from the group consisting of a sulfonic acid group-containing polyamide diol and a sulfonic acid group-containing polyester diol;
(b) a dihydroxyhydrocarbon having a number average molecular weight of from 400 to 4,000; and
(c) a diisocyanate;
(B) an ethylenically unsaturated compound; and
(C) a photopolymerization initiator, the weight ratio of component (B) to component (A) being in the range of from 5/100 to 200/100, and the weight ratio of component (C) to component (A) being in the range of from 0.1/100 to 30/100.

Sulfonic acid group-containing polyurethane (A) is as described above.

As examples of ethylenically unsaturated compound (B), conventional ethylenically unsaturated monomers and ethylenically unsaturated prepolymers can be mentioned.

Representative examples of ethylenically unsaturated monomers include:

(1) ethylenically unsaturated carboxylic esters, such as acrylic acid and methacrylic acid, an alkyl acrylate, an alkyl methacrylate, a cycloalkyl acrylate, a cycloalkyl methacrylate, an alkyl halide acrylate, an alkyl halide methacrylate, an alkoxyalkyl acrylate, an alkoxyalkyl methacrylate, a hydroxyalkyl acrylate, a hydroxyalkyl methacrylate, an aminoalkyl acrylate, an aminoalkyl methacrylate, tetrahydrofurfuryl acrylate, tetrahydrofurfuryl methacrylate, allyl acrylate, allyl methacrylate, glycidyl acrylate, glycidyl methacrylate, benzyl acrylate, benzyl methacrylate, phenoxy acrylate, phenoxy methacylate, a di-acrylate of alkylene glycol, a dimethacrylate of alkylene glycol, trimethylolpropane triacrylate, trimethylolpropane trimethacrylate, glycerol triacrylate, glycerol trimethacrylate, pentaerythritol tetraacrylate, and pentaerythritol tetramethacrylate;

(2) acrylamides, methacrylamides and derivatives thereof, such as an acrylamide N-substituted with an alkyl or hydroxyalkyl group, a methacrylamide N-substituted with an alkyl or hydroxyalkyl group, an acrylamide N,N'-disubstituted with alkyl and/or hydroxyalkyl groups, a methacrylamide N,N'-disubstituted with alkyl and/or hydroxyalkyl groups, diacetone acrylamide, diacetone methacrylamide, an N,N'-alkylene-bis-acrylamide, and an N,N'-alkylene-bis-methacrylamide;

(3) allyl compounds, such as allyl alcohol and allyl isocyanate;

(4) maleic acid, fumaric acid, and esters thereof, for example, a mono- or di-alkyl maleate, a mono- or di-alkyl fumarate, a mono- or di-haloalkyl maleate, a mono- or di-haloalkyl fumarate, a mono- or di-alkoxyalkyl maleate, and a mono- or di-alkoxyalkyl fumarate; and (5) other ethylenically unsaturated compounds, such as styrene, vinyltoluene, divinylbenzene, N-vinyl-carbazole and N-vinyl-pyrrolidone.

Of these ethylenically unsaturated monomers, (meth)acrylic esters having acryloyloxy groups and methacryloyloxy groups are particularly preferred.

Further examples of ethylenically unsaturated monomers include diethylene glycol dimethacrylate, tetraethylene glycol dimethacrylate, 2-methacryloyloxyethyl-2-hydroxyethyl phthalate, 2-methacryloxyethyl-2- hydroxypropyl phthalate, 1-acryloyloxy-2-hydroxy-3-phenoxypropane, 1-methacryloyloxy-2-hydroxy-3-phenoxypropane, phenoxyethyl acrylate, phenoxyethyl methacrylate, phenoxytetraethylene glycol acrylate, ethoxylated bisphenol A diacrylate, ethoxylated bisphenol A dimethacrylate, bis(acryloyloxyethyl)hydroxyethyl isocyanurate, tris(acryloyloxyethyl)isocyanurate, bis(methacryloyloxyethyl)hydroxyethyl isocyanurate, tris(methacryloyloxyethyl)hydroxyethyl isocyanurate and the like.

On the other hand, the ethylenically unsaturated prepolymer can be produced by introducing ethylenically unsaturated groups to a polyester, a polyurethane, a polyether, an epoxy resin, an acrylic resin and the like by the use of an ethylenically unsaturated compound having a reactive group, such as a carboxyl group, a hydroxyl group and an isocyanate group.

Representative examples of ethylenically unsaturated prepolymers include polyesters produced by the reaction of an ethylenically unsaturated dicarboxylic acid, such as maleic acid, fumaric acid, itaconic acid or an acid anhydride thereof, with a polyhydric alcohol, such as ethylene glycol, propylene glycol, 1,4-butanediol, 1,6-hexanediol, diethylene glycol, triethylene glycol, glycerin, trimethylolpropane or pentaerythritol; polyesters produced by the reaction between three types of compounds, namely, the above-mentioned unsaturated dicarboxylic acid or anhydride thereof, a saturated polybasic acid, such as succinic acid, adipic acid, phthalic acid, isophthalic acid, phthalic acid, isophthalic acid, phthalic anhydride or trimellitic acid, and the above-mentioned polyhydric alcohol; and polyesters as obtained by modifying the above polyesters with a drying oil aliphatic acid or a semidrying oil aliphatic acid. Still another example of an ethylenically unsaturated polyester is an oligoesteracrylate or an oligoestermethacrylate having a molecular weight of not smaller than 500 as produced by adding acrylic acid or methacrylic acid to the above-mentioned reaction system of the saturated polybasic acid and the polyhydric alcohol and subjecting the resultant mixture to co-polycondensation.

Examples of ethylenically unsaturated polyurethane prepolymers include ethylenically unsaturated polyurethanes produced by reacting a polyisocyanate with an ethylenically unsaturated compound having hydroxyl groups. Examples of polyisocyanates include tolylene diisocyanate (TDI), diphenylmethane-4-4'-diisocyanate (MDI), hexamethylene diisocyanate (HMDI), naphthylene-1,5-diisocyanate (NDI), xylylene diisocyanate (XDI), o-tolidine diisocyanate (TODI), isophorone diisocyanate (IPDI), polymethylene phenyl isocyanate and the like. Examples of ethylenically unsaturated compounds include an alkylene glycol mono(meth)acrylate, a polyoxyalkylene glycol mono(meth)acrylate, allyl alcohol and the like.

Further examples of ethylenically unsaturated polyurethane prepolymer include polyurethanes produced by reacting an ethylenically unsaturated compound having a hydroxyl group or an amino group (i.e., a group having an active hydrogen) with a polyurethane compound having terminal isocyanate groups, which polyurethane compound is obtained by reacting a polyol with a polyisocyanate which is used in an excess amount. Examples of polyols include the above-mentioned polyhydric alcohols; polyesterpolyols, such as polycaprolactone diol, polyvalerolactone diol, polyethylene adipate diol and polypropylene adipate diol; polyether polyols, such as polyoxyethylene glycol, polyoxypropylene glycol, polyoxyethyleneoxypropylene glycol and polyoxytetramethylene glycol; and polymer polyols, such as 1,4-polybutadiene, hydrogenated 1,2-polybutadiene or non-hydrogenated 1,2-polybutadiene, a butadiene-styrene copolymer and a butadiene-acrylonitrile copolymer, which each have terminal hydroxyl groups. Examples of ethylenically unsaturated compounds include an alkylene glycol monomethacrylate, a polyoxyalkylene glycol mono(meth)acrylate, allyl alcohol and an aminoalkyl(meth)acrylate. Further examples of ethylenically unsaturated polyurethane prepolymers include polyurethanes obtained by reacting an ethylenically unsaturated compound, such as allyl isocyanate and isocyanatoethyl methacrylate, with a polyurethane compound having a terminal hydroxyl group which is obtained by reacting the above-mentioned polyol with a polyisocyanate, wherein the polyol is used in an excess amount. Still further examples of ethylenically unsaturated polyurethane prepolymers include compounds produced by linking the above-mentioned unsaturated polyesters with a polyisocyanate.

Examples of ethylenically unsaturated polyether prepolymers include esters obtained by reacting a polyether glycol, such as polyoxyethylene glycol, polyoxypropylene glycol, polyoxyethyleneoxypropylene glycol and polyoxytetramethylene glycol, with acrylic acid or methacrylic acid.

Examples of ethylenically unsaturated epoxy resin prepolymers include epoxy resins produced by reacting a bisphenol type epoxy compound, a phenol- or cresol-novolac type epoxy compound, a halogenated bisphenol compound, a resorcinol type epoxy compound or an alicyclic epoxy compound with an ethylenically unsaturated compound having a carboxyl group, such as acrylic acid or methacrylic acid.

Examples of ethylenically unsaturated acrylic resin prepolymers include acrylic resins produced by reacting an acrylic resin which is obtained by copolymerizing a monomer having a functional group, such as a carboxyl group, a hydroxyl group and a glycidyl group, with an ethylenically unsaturated compound having a functional group capable of reacting with the above-mentioned functional group of the monomer. For example, unsaturated acrylic resins are produced by effecting addition of glycidyl (meth)acrylate to a copolymer of (meth)acrylic acid and various types of (meth)acrylates, styrene or vinyl acetate. Alternatively, unsaturated acrylic resins can be used, which are produced by effecting addition of acrylic acid or methacrylic acid to a copolymer containing a glycidyl acrylate group and the like.

As ethylenically unsaturated compound (B), the above-mentioned monomers and prepolymers may be used individually or in combination. The weight ratio of ethylenically unsaturated compound (B) to sulfonic acid group-containing polyurethane (A) is generally in the range of from 5/100 to 200/100. When the weight ratio is less than 5/100, it is likely that the photosensitive resin composition cannot be cured sufficiently by exposure to actinic rays, whereas when the weight ratio exceeds 200/100, the mechanical properties of the ultimate printing plate are likely to be unsatisfactory.

Various photopolymerization initiators as customarily used can be employed as photopolymerization initiator component (C) of the photosensitive resin composition of the present invention. Preferred examples of photopolymerization initiators include various organic carbonyl compounds. Among organic carbonyl compounds, aromatic carbonyl compounds are particularly preferred.

Representative examples of aromatic carbonyl compounds include:

(1) benzoins represented by formula (I):

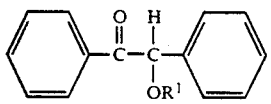

wherein $R^1$ represents a hydrogen atom or an alkyl group, such as a methyl group, an ethyl group, an isopropyl group and an isobutyl group;

(2) phenyl ketones represented by formula (II):

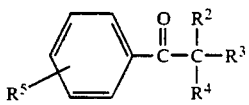

wherein $R^2$, $R^3$, $R^4$ and $R^5$ each independently represent a hydrogen atom, a halogen atom, an alkyl group, an alkoxy group, a hydroxyl group, a phenyl group, an alkylthio group, a morpholino group and the like; and (3) benzophenones represented by formula (III):

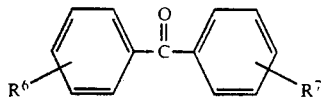

wherein $R^6$ and $R^7$ each independently represent a hydrogen atom, an alkoxy group, a carboxyl group, an alkoxycarbonyl group, an alkylthio group, an amino group and the like.

Examples of benzoins represented by formula (I) include benzoin, benzoin methyl ether, benzoin ethyl ester, benzoin isopropyl ether, benzoin n-butyl ether, and benzoin isobutyl ether.

Examples of phenylketones represented by formula (II) include dimethoxyphenylacetophenone, diethoxyphenylacetophenone, diethoxyacetophenone, 2-hydroxy-2-methylpropiophenone, 4'-isopropyl-2-hydroxy-2-methylpropiophenone, 2,2-dichloro-4'-phenoxyacetophenone, 1-hydroxycyclohexylphenylketone, 4'-methylthio-2-morpholino-2-methylpropiophenone and 4'-dodecyl-2-hydroxy-2-methylpropiophenone.

Examples of benzophenones represented by formula (III) include benzophenone, benzoylbenzoic acid, methyl benzoylbenzoate, ethyl benzoylbenzoate, isopropyl benzoylbenzoate, 3,3'-dimethyl-4-methoxybenzophenone, 4-benzoyl-4'-methyldiphenylsulfide, 4,4'-bisdimethylaminobenzophenone and 4,4'-bisdiethylaminobenzophenone.

Further examples of aromatic carbonyl compounds include benzils, such as benzil and 4,4'-dimethoxybenzil; methyl phenylglyoxylate; anthraquinones, such as anthraquinone, 2-ethylanthraquinone and 2-chloroanthraquinone; thioxanthones, such as thioxanthone, 2,4-dimethylthioxanthone and isopropylthioxanthone; oxime esters, such as 1-phenyl-1,2-propanedione-2-(o-ethoxycarbonyl)oxime and 1-phenyl-1,2-propanedione-2-o-benzoyloxime; acylphosphine oxides, such as benzoyl diethoxyphosphine oxide and 2,4,6-trimethylbenzoyl diphenylphosphine oxide; and aminobenzoic acid esters, such as N,N'-dimethyl aminoethyl benzoate and N,N'-dimethyl isopropyl benzoate.

Further examples of organic carbonyl compounds include camphorquinone and acetoin.

Examples of photopolymerization initiators other than carbonyl compounds include an imidazole dimer, such as 2,4,5-triphenylbisimidazole and 2-(o-chlorophenyl)-4,5-dimethoxyphenylbisimidazole.

These photopolymerization initiators may be used individually or in combination. The weight ratio of photopolymerization initiator (C) to sulfonic acid group-containing polyurethane (A) is generally in the range of from 0.1/100 to 30/100.

In order to prevent thermal polymerization reactions (reactions in the darkness) during storage, various thermal polymerization inhibitors or polymerization retarders as customarily used may optionally be incorporated into the photosensitive resin composition of the present invention. Examples of thermal polymerization inhibitors and polymerization retarders include quinones, such as benzoquinone, hydroquinone, 2,5-di-t-butylhydroquinone and 2,5-diphenyl-p-benzoquinone; phenols, such as p-methoxyphenol, 2,6-di-t-butyl-p-cresol, catechol, pyrogallol, picric acid, β-naphthol, 2,2'-methylene-bis(4-methyl-6-t-butylphenol), 2,2'-thiobis(4-methyl-6-t-butylphenol), pentaerythrityltetrakis[3-(3,5-di-t-butyl-4-hydroxyphenyl)propionate] and tocopherol; amines, such as aniline, naphthylamine, N,N'-diphenyl-p-phenylenediamine, N-N'-bis-(β-naphthyl)-p-phenylenediamine, N-nitrosophenylhydroxylamine, N-nitro-cyclohexylhydroxylamine and an ammonium salt thereof and p-nitrosodimethylaniline; an aryl phosphite; an aryl alkylphosphite; pyridine; phenothiazine; methylene blue; nitrobenzene; copper (I) chloride; and copper naphthenate. These may generally be used in an amount of from 0.005 to 1% by weight, based on the total weight of the photosensitive resin composition.

The photosensitive resin composition of the present invention may optionally further contain additives, such as, a dye, a pigment and an organic or an inorganic filler as long as such additives do not adversely affect the desired performance of the photosensitive resin composition. It is advantageous that a plasticizer as conventionally used be incorporated into the photosensitive resin composition in order to impart improved sheeting properties to the resin composition and impart improved flexibility to the ultimate printing plate. There is no particular limitation with respect to the plasticizer as long as it has good compatibility with components (A), (B) and (C) and exhibits a satisfactory plasticizing effect. Examples of plasticizers include glycerin, polyethylene glycol, benzenesulfonamide, toluenesulfonamide, N-ethyltoluenesulfonamide, N-methyltoluenesulfonamide, a p-hydroxybenzoic acid ester, olefin-type oligomers, vinyl-type oligomers and diene-type oligomers. These additives may be incorporated in the composition in an amount such as usually employed in the art.

The preparation of a shaped plate from the photosensitive resin composition can be performed, for example, by a method in which components (A), (B) and (C) are dissolved in water or an organic solvent and completely mixed with each other to obtain a uniform solution, and the solution is poured onto a support in an even thickness, followed by allowing the solvent to evaporate to thereby obtain a photosensitive resin shaped plate having a thickness of from 0.1 to 10.0 mm. Alternatively, a shaped plate can be prepared by a method in which a particulate resin obtained by distilling off the solvent from the above-mentioned solution containing components (A), (B) and (C), is placed on a support and subjected to press molding at an elevated temperature, thereby obtaining a photosensitive resin shaped plate. There may also be mentioned a method in which components (A), (B) and (C) are completely mixed by means of a kneader or a Banbury mixer, and the resultant mixture is placed on a support, followed by press molding, thereby obtaining a shaped plate. Further, the preparation of a shaped plate may also be performed by other customary methods, such as cast molding and extrusion molding.

Adhesion between the shaped plate and a support may not necessarily be effected simultaneously with the formation of the shaped plate. That is, a shaped plate having no support, which has previously been prepared, may be attached to a support by an adhesive. Further, a shaped plate having no support may itself be used as a photosensitive plate material for producing a printing plate. In the case where no support is employed, the preparation of a shaped plate from the photosensitive resin composition of the present invention and the production of a relief printing plate therefrom can be performed, for example, by the method described in Japanese Patent Application Publication No. 45-23615. In the case where a shaped plate having a support is prepared, it is advantageous to provide an antihalation layer as well as an adhesive layer between the support and the shaped plate.

Examples of supports which may be employed in the present invention include a plastic sheet made of poly ethylene terephthalate, polypropylene, cellulose triacetate or polycarbonate; a rubber sheet made of a synthetic rubber; metallic sheets; synthetic-paper sheets; and composite materials prepared therefrom.

There is no particular limitation with respect to the shape of the shaped plate of the present invention. The shaped plate may be in the form of a planar sheet. Alternatively, the shaped plate may be in the form of a sleeve. Further, the shaped plate may be formed over the outer periphery of a cylindrically shaped support. The thickness of the shaped plate is generally in the range of from 0.1 to 10.0 mm, irrespective of the shape thereof.

The production of a flexographic printing plate using the shaped plate of the present invention as a photosensitive plate material, may be performed, for example, by a method in which:

(1) an image-bearing transparency (e.g., a negative film) is disposed on the photosensitive plate material, followed by pressing the image-bearing transparency to the plate material by using a vacuum frame and the like;

(2) the plate material is exposed for a short period of time to actinic rays emitted from a light source from the side not facing the image-bearing transparency to effect back exposure, thereby forming a thin cured layer of the resin composition having a uniform thickness in the plate material over the entire area not facing the image-bearing transparency;

(3) the plate material is further irradiated with actinic rays emitted from the light source through the image-bearing transparency to effect relief exposure, thereby photocuring the photosensitive material in a pattern corresponding to the transmitting pattern of the image-bearing transparency;

(4) the unexposed (uncured) portions of the cured plate material are removed with a washing liquid by means of a brush-type or spray-type wash-out machine, to thereby effect development of the relief pattern;

(5) the resultant relief plate is dried by blowing the plate with hot air; and (6) the relief plate is optionally subjected to post-exposure to perform a complete curing of the entire plate.

In the above method, steps (2) and (3) for exposure may be performed in either order. Further, post-exposure in step (6) may be performed in water and, in such a case, drying in step (5) is performed after the post-exposure.

In the above-mentioned method for producing a relief printing plate, as a light source of actinic rays for the exposures, there may be used, for example, a mercury lamp, a high pressure mercury lamp, an ultraviolet fluorescent lamp, a carbon arc lamp, a metal halide lamp or a xenon lamp.

Representative examples of image-bearing transparencies used for the formation of a relief include a negative or positive film which is the same type as that for use in a photographic process in which silver salt image is utilized, and a sheet or film which is substantially transparent to actinic rays, such as a plastic film, a plastic sheet, a glass sheet, a cellophane film, a cellophane sheet and a paper sheet, which has an image formed by imagewise masking the surface thereof by the use of a light shielding film which is not transparent to actinic rays.

Representative examples of washing liquids for washing out an uncured resin composition include water; an aqueous solution, e.g., an aqueous alkali solution, such as an aqueous sodium hydroxide solution, an aqueous sodium carbonate solution, an aqueous sodium phosphate solution, an aqueous sodium tripolyphosphate solution, an aqueous sodium borate solution and an aqueous sodium silicate solution. The aqueous solution optionally contains a surfactant.

As described above, the sulfonic acid group-containing polyurethane of the present invention has not only high hydrophilicity but also excellent mechanical strength, excellent heat resistance, low permanent tensile set and low hardness, which are required for the base polymer for a photosensitive resin composition to be used for producing a flexographic printing plate, and has also excellent compatibility with an ethylenically unsaturated compound. The photosensitive resin composition containing such a sulfonic acid group-containing polyurethane has excellent photosensitivity and, in addition, has excellent properties such that after the photosensitive resin composition has been exposed to actinic rays through an image-bearing transparency, the development of the exposed composition can be performed with water or an aqueous alkali solution optionally containing a surfactant, thereby producing a flexographic printing plate which has excellent printing resistance, ink resistance and mechanical properties.

DETAILED DESCRIPTION OF PREFERRED EMBODIMENTS

The present invention will now be described in greater detail with reference to the following Examples and Comparative Example, which should not be construed as limiting the scope of the present invention.
Example 1.

115.2 g of an equimolar salt of sodium 3,5-dicarboxybenzenesulfonate and hexamethylenediamine, 80.4 g of sodium 3,5-dicarboxybenzenesulfonate, 203.4 g of ε-caprolactam, 0.4 g of N,N'-hexamethylene-bis(3,5-di-t-butyl-4-hydroxycinnamic acid amide) (trade name: Irganox 1098, produced by CIBA Geigy AG) and 1.2 g of phosphoric acid, are charged into a 2,000 ml-volume separable flask equipped with a stirrer, an inlet for nitrogen gas and an outlet for a distillate. The mixture is heated at 240° C. for 6 hours in an atmosphere of nitrogen gas. Further, the heating is continued at 230° C. for 1.5 hours under reduced pressure while removing unreacted ε-caprolactam, thereby obtaining a pale yellowish polyamide oligomer having terminal carboxyl groups.

The amount of recovered ε-caprolactam is 16.9 g. Calculation based on the amount shows that the number average molecular weight of the polyamide oligomer is 1,237.

Next, 123.7 g of polyamide oligomer obtained above, 124 g of ethylene glycol, 0.25 g of Irganox 1098, and 0.75 g of polyphosphoric acid are charged into a 500 ml-volume separable flask equipped with a stirrer, an inlet for nitrogen gas and an outlet for a distillate. The mixture is heated at 220° C. for 4 hours in an atmosphere of nitrogen gas, and then unreacted ethylene glycol is distilled off under reduced pressure, thereby obtaining a pale yellowish sulfonic acid group-containing polyamide diol having terminal hydroxy groups.

The obtained sulfonic acid group-containing polyamide diol has a number average of molecular weight of 1,308, as calculated from a hydroxyl value which is measured using a solution composed of acetic anhydride, pyridine and N-methylpyrrolidone in respective proportions of 1 ml, 2 ml and 7 ml.

Subsequently, 26.2 g of sulfonic acid group-containing polyamide diol having terminal hydroxy group mentioned above and 0.05 g of 2,6-di-t-butyl-4-methylphenol are charged into a 1,000 ml-volume separable flask equipped with a stirrer, an inlet for nitrogen gas and an outlet for a distillate. Then, 105.0 g of N-methylpyrrolidone is added to the mixture, and stirred at 150° C. to thereby form a solution. 6.7 g of hexamethylene diisocyanate is dropwise added to the solution at 150° C. for 30 minutes.

Subsequently, to the solution, 126.2 g of a 20% by weight N-methylpyrrolidone solution of polyethylene glycol having a number average molecular weight of 631 is dropwise added at 150° C. over a period of 30 minutes to obtain an N-methylpyrrolidone solution of a polyamide-ester having polyethylene glycol units at its both terminals. Then, to the obtained N-methylpyrrolidone solution, 6.7 g of hexamethylene diisocyanate is dropwise added at 150° C. over a period of 30 minutes.

Subsequently, to the resultant mixture, 455.2 g of a 20% by weight N-methylpyrrolidone solution of polybutadiene (G-2000: manufactured by Nihon Soda Co., Ltd.) having a number average molecular weight of 2276 and hydroxyl groups at its both terminals is dropwise added at 150° C. over a period of 30 minutes, thereby obtaining a polyamide-ester having polybutadienol units at its both terminals. Further, to the resultant mixture, 3.36 g of hexamethylene diisocyanate is dropwise added at 150° C. over a period of about one hour. As a result, deposition of a polymer is observed. The reaction is continuously carried out for a total of 2 hours, and then N-methylpyrrolidone is distilled off under reduced pressure to thereby obtain a pale yellowish polymer.

Subsequently, an uniform, transparent photosensitive resin composition is obtained by blending 50 g of polymer obtained above with 5 g of N-ethylenetoluenesulfonamide, 0.08 g of 2,6-di-t-butyl-p-cresol, 1.5 g of 2,2'-dimethoxyphenylacetophenone, 1.0 g of acryl oligoester monomer having hydroxyl groups [M-600A: manufactured by Shakueisha Yushi Co., Ltd.], 5 g of lauryl methacrylate and 5 g of polyethylene glycol 400 dimethacrylate (NK ester 9G: manufactured by Shin Nakamura Kagaku Kogyo Co., Ltd.) at 150° C. in an atmosphere of nitrogen gas by means of a kneader.

The thus obtained composition is sandwiched between a 100 μm-thick polyester film and a 100 μm-thick polyester film having an adhesive coated thereon, and heat pressed at 120° C. under a pressure of 150 kg/cm², using a 2.0 mm-thick spacer to control the thickness of the composition. Thus, a shaped plate material having a 2 mm-thick transparent photosensitive resin layer disposed on the adhesive of the 100 μm-thick polyester film is produced.

Subsequently, a negative film having a character and a pattern is superimposed on the photosensitive resin layer. Through the negative film, the plate material is exposed to ultraviolet rays having an intensity of 2.5 mW/cm² radiated from an ultraviolet fluorescent lamp for 20 minutes. Then, the negative film is removed, and the plate material is brushed by means of a conventional brush type developer in a neutral aqueous solution at 40° C. for 20 minutes, thereby removing unexposed portions. Then, the plate material is dried, and irradiated with the above-mentioned light source for 20 minutes under the same conditions as described above. Thus, a relief printing plate is obtained.

When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

On the other hand, from the photosensitive resin composition mentioned above, a shaped plate material having a 0.5 mm-thick transparent photosensitive resin layer disposed on a 100 μm-thick polyester film is prepared in the manner as described above. The thus prepared plate material is exposed to ultraviolet rays, developed, dried and post-exposed in the manner as described above, and the polyester film is removed from the plate material. The respective swelling ratios of the resultant plate material in water and isopropanol are measured as follows. That is, the plate material in the dry state is weighed to obtain weight $W_1$, immersed in water at 20° C. for 24 hours, taken out, and weighed to obtain weight $W_2$. The swelling ratio (X %) in water is calculated by the formula:

$$X = \frac{W_2 - W_1}{W_1} \times 100 \, (\%)$$

The above procedure is repeated using isopropanol in place of water, thereby obtaining a swelling ratio in isopropanol. The swelling ratios of the plate material in water and isopropanol are, respectively, 16.4% and 19.8%.

COMPARATIVE EXAMPLE 1

60.3 g of polyoxyethylene glycol having a number average molecular weight of 2,010, 0.04 g of 2,6-di-t- butyl-4-methylphenol and 0.08 g of N,N'-hexamethylenebis(3,5-di-t-butyl-4-hydroxycinnamic acid amide) (trade name: Irganox 1098, produced by CIBA Geigy AG) are charged into a 1,000 ml-volume separable flask equipped with a stirrer, an inlet for nitrogen gas and an outlet for a distillate. The mixture is heated at 100° C., and 6.7 g of hexamethylene diisocyanate is added. The reaction is carried out for 4 hours, to thereby obtain a polyethylene glycol derivative having terminal isocyanate groups.

Subsequently, 13.1 g of sulfonic acid group-containing polyamide diol obtained in Example 1, which has terminal hydroxy groups and has a number average of molecular weight of 1,308, is charged into the flask. To the mixture, 419 g of N-methyl-2-pyrrolidone is added, and stirred at 100° C. to form a solution. 0.15 g of dibutyltin laurate is dropwise added, and the reaction is effected at 100° C. for 5 hours. Then, N-methylpyrrolidone is distilled off, thereby obtaining a pale yellowish polymer.

Subsequently, an uniform, transparent photosensitive resin composition is obtained by blending 50 g of polymer obtained above with 5 g of N-ethylenetoluenesulfonamide, 0.08 g of 2,6-di-t-butyl-p-creso, 1.5 g of 2,2'-dimethoxyphenylacetophenone, 1.0 g of acryl oligoester monomer having hydroxyl groups [M-600A: manufactured by Shakueisha Yushi Co., Ltd.], 5 g of lauryl methacrylate and 5 g of polyethylene glycol 400 dimethacrylate (NK ester 9G: manufactured by Shin Nakamura Kagaku Kogyo Co., Ltd.) at 150° C. in an atmosphere of nitrogen gas by means of a kneader.

From the thus obtained composition, a shaped plate material having a 2 mm thick transparent photosensitive resin layer superimposed, through an adhesive, on a 100 μm-thick polyester film is produced in substantially the same manner as in Example 1. Further, a relief printing plate is prepared by subjecting the shaped plate material to exposure, developing, drying and back exposure in substantially the same manner as in Example 1.

When printing is performed using the thus prepared relief printing plate fitted on a rotary flexographic press, it is impossible to produce sharp impressions with little broadening of the image, indicating that the printing plate is poor in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 210.3% and 36.9%.

EXAMPLE 2

55.0 g of polybutadiene (G-2000 manufactured by Nippon Soda Co., Ltd., Japan) having a number average molecular weight of 2,200 and having terminal hydroxyl groups, 0.04 g of 2,6-di-t-butyl-4-methylphenol and 0.08 g of N,N'-hexamethylene-bis(3,5-di-t-butyl-4-hydroxycinnamic acid amide) (trade name: Irganox 1098, produced by CIBA Geigy AG) are charged into a 1,000 ml-volume separable flask provided with a stirrer, an inlet for nitrogen gas and an outlet for a distillate. The resultant mixture is heated to 100° C. and 5.9 g of hexamethylene diisocyanate is added, and reaction is carried out for 4 hours, thereby obtaining a light yellow polymer of polybutadiene derivative having terminal isocyanate groups.

Subsequently, 13.1 g of the sulfonic acid group-containing polyamide diol obtained in Example 1, which has terminal hydroxyl groups and has a number average molecular weight of 1,308, is charged into the flask. To the flask is added 419 g of N-methylpyrrolidone, and the resultant mixture is stirred at 100° C. to obtain a solution. 0.15 g of dibutyltin laurate is dropwise added, and reaction is performed at 100° C. for 5 hours, followed by distilling off of N-methylpyrrolidone, thereby obtaining a slightly yellowish polyurethane polymer.

Subsequently, 50 g of the thus obtained polymer is kneaded by a kneader at 150° C. in an atmosphere of nitrogen together with 5 g of N-ethyltoluenesulfonamide, 0.08 g of 2,6-di-t-butyl-p-cresol, 1.5 g of 2,2'-dimethoxyphenylacetophenone, 1.0 g of an acryl oligoester monomer having hydroxyl groups (M-600A manufactured by Kyoeisha Yushi Co., Ltd., Japan), 5 g of lauryl methacrylate and 5 g of polyethylene glycol 400 dimethacrylate (NK ester 9G manufactured by Shin Nakamura Kagaku Kogyo Co., Ltd., Japan), thereby obtaining a uniform, transparent photosensitive resin composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development at 60° C. for 60 minutes, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 8.5% and 15.7%.

EXAMPLE 3

76.8 g of an equimolar salt of sodium 3,5-dicarboxybenzenesulfonate and hexamethylenediamine, 53.6 g of sodium 3,5-dicarboxybenzenesulfonate, 135.6 g of ε-caprolactam, 0.4 g of Irganox 1098 and 177 g of water are charged into a 2,000 ml-volume autoclave provided with a stirrer, an inlet for nitrogen gas and an outlet for a distillate. The autoclave is fully evacuated in an atmosphere of nitrogen gas, and sealed, and then the temperature is gradually increased to 220° C., and kept at 220° C. for 6 hours under an inner pressure of 25 kg/cm². Then, the inner pressure is reduced to the atmospheric pressure and reaction is further conducted for 1.0 hour in an atmosphere of nitrogen gas, thereby obtaining a light yellow polyamide oligomer having terminal carboxyl groups. The thus obtained polyamide oligomer has a number average molecular weight of 1,294 as calculated based on the acid value.

Next, 129.4 g of the above-obtained polyamide oligomer, 124 g of ethylene glycol, 0.25 g of N,N'-hexamethylene-bis(3,5-di-t-butyl-4-hydroxycinnamic acid amide) (trade name: Irganox 1098, produced by CIBA Geigy AG) and 0.75 g of polyphosphoric acid are charged into a 500 ml-volume separable flask provided with a stirrer, an inlet for nitrogen gas and the outlet for a distillate, and the resultant mixture is reacted at 220° C. for 4 hours in an atmosphere of nitrogen, followed by distilling off of unreacted ethylene glycol under a reduced pressure, thereby obtaining a light yellow polymer of sulfonic acid group-containing polyamide diol having terminal hydroxyl groups. The polyamide diol has a number average molecular weight of 1,440.

Next, 28.8 g of the thus obtained sulfonic acid group-containing polyamide diol having terminal hydroxyl groups, 136.6 g of polybutadiene (G-2000: manufactured by Nihon Soda Co., Ltd.) having a number average molecular weight of 2276 and hydroxyl groups at its both terminals, and 0.05 g of 2,6-di-t-butyl-4-methylphenol are charged into a 2,000 ml-volume separable flask provided with a stirrer, an inlet for nitrogen gas and an outlet for a distillate. To the resultant mixture is added 721.0 g of N-methylpyrrolidone, and stirred at 100° C. to obtain a solution. Reaction is performed at 100° C. for 2 hours while dropwise adding 14.8 g of hexamethylene diisocyanate. Then, 0.3 g of dibutyltin dilaurate is added thereto, and reaction is continued at 100° C. for 1 hour, followed by distilling off unreacted N-methyl-pyrrolidone under a reduced pressure, thereby obtaining a light yellow polyurethane polymer.

Subsequently, 60 g of the thus obtained polymer is kneaded by a kneader at 150° C. in an atomosphere of nitrogen together with 36 g of a maleate of polybutadiene diol (Poly bd R-45MA manufactured by Idemitsu Sekiyukagaku K.K., Japan), 0.10 g of 2,6-di-t-butyl-p-cresol, 2.0 g of 2,2'-dimethoxyphenyl acetophenone and 12 g of glycerol monomethacrylate, thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 10.1% and 19.5%.

EXAMPLE 4

148.6 g of a hydrogenated polybutadiene having terminal hydroxyl groups and having an number average molecular weight of 2,477 [GI-2000 produced by Nippon Soda Co., Ltd., Japan], 0.05 g of 2,6-di-t-butyl-4-methylphenol and 0.08 g of N,N'-hexamethylenebis(3,5-di-t-butyl-4-hydroxy cinnamic acid amide) (Irganox 1098 produced by CIBA Geigy AG) are charged into a 1,000 ml-volume separable flask provided with a stirrer, an inlet for nitrogen gas and an outlet for a distillate. The resultant mixture is heated to 100° C. and 13.4 g of hexamethylene diisocyanate is added thereto, and reaction is performed for 4 hours, thereby obtaining a light yellow polymer of polybutadiene derivative having terminal isocyanate groups. Thereafter, 28.8 g of sulfonic acid group-containing polyamide diol having terminal hydroxyl groups and having a number average molecular weight of 1,440 obtained in Example 3 is added to the reaction mixture, and 445 g of N-methyl pyrrolidone is further added thereto, followed by stirring at 100° C. Then, 0.15 g of dibutyltin laurate is dropwise added to the solution and reacted at 100° C. for 5 hours, followed by distilling off of N-methyl pyrrolidone, thereby obtaining a slightly yellowish polyurethane polymer.

Subsequently, 60 g of the thus obtained polymer is kneaded by a kneader at 150° C. in an atmosphere of nitrogen together with 30 g of α,ω-polybutadiene dicarbonate (C-1000 produced by Nippon Soda Co., Ltd., Japan), 0.08 g of 2,6-di-t-butyl-p-cresol, 2.1 g of 2,2'-dimethoxyphenyl acetophenone and 10 g of nonylphenoxy polyethylene glycol acrylate (Aronics M-111 produced by Toa Gosei K.K., Japan), at 150° C. by a kneader in an atmosphere of nitrogen, thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 8.5% and 11.0%.

EXAMPLE 5

43.2 g of the sulfonic acid group-containing polyamide diol having terminal hydroxyl groups and having a number average molecular weight of 1,440 obtained in Example 3 and 243.9 g of polybutadiene diol having a number average molecular weight of 2,439 (Poly bd R-45HT produced by Idemitsu Sekiyukagaku K.K., Japan) are charged into a 2,000 ml-volume separable flask provided with a stirrer, an inlet for nitrogen gas and an outlet for a distillate. Then, 1,020 g of N-methyl pyrrolidone is added and heated to 130° C. while stirring to obtain a solution. 21.8 g of hexamethylene diisocyanate and 0.3 g of dibutyltin laurate are dropwise added and reacted at 130° C. for 5 hours. After the reaction, N-methyl pyrrolidone is removed by distillation, thereby obtaining a slightly brown polyurethane elastomer.

Subsequently, 72 g of the thus obtained elastomer is kneaded by a kneader at 150° C. in an atmosphere of nitrogen together with 36 g of a maleate of polybutadiene diol (Poly bd R-45MA produced by Idemitsu Sekiyukagaku K.K., Japan), 0.12 g of 2,6-di-t-butyl-p-cresol, 2.4 g of 2,2'-dimethoxyphenyl acetophenone and 12 g of glycerol monomethacrylate, thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 7.2% and 11.3%.

EXAMPLE 6

148.1 g of sodium 3,5-dicarboxy methylbenzenesulfonate, 160 g of ethylene glycol, 0.30 g of N,N'-hexamethylene-bis(3,5-di-t-butyl-4-hydroxy cinnamic acid amide) (Irganox 1098 produced by CIBA Geigy AG) and 0.30 g of zinc acetate are charged into a 1,000 ml-volume separable flask provided with a stirrer, an inlet for nitrogen gas and an outlet for a distillate. The resultant mixture is reacted at 220° C. for 3 hours in an atmosphere of nitrogen, and then unreacted ethylene glycol is removed by distillation under a reduced pressure, thereby obtaining a light yellow polymer of sulfonic acid group-containing polyester diol having terminal hydroxyl groups. The sulfonic acid group-containing polyester diol has a number average molecular weight of 787 as calculated based on the hydroxyl value.

Subsequently, 19.7 g of the above-obtained sulfonic acid group-containing polyester diol having terminal hydroxyl groups, 113.8 g of polybutadiene (G-2000 produced by Nippon Soda Co., Ltd., Japan) having hydroxyl groups at both terminals and having a number average molecular weight of 2,276 and 0.05 g of 2,6-di-t-butyl-4-methylphenol are charged into a 2,000 ml-volume separable flask provided with a stirrer, an inlet for nitrogen gas and an outlet for a distillate, and 828.0 g of N-methyl pyrrolidone is added thereto, followed by heating to 130° C. while stirring. To the resultant solution is added 0.39 g of dibutyltin dilaurate and reaction is carried out at 130° C. for 4 hours while dropwise adding 12.6 g of hexamethylene diisocyanate, thereby obtaining a polyurethane polymer.

Subsequently, 72 g of the thus obtained polymer is kneaded by a kneader at 150° C. in an atmosphere of nitrogen together with 36 g of a maleate of polybutadiene diol (Poly bd R-45MA produced by Idemitsu Sekiyukagaku K.K., Japan), 0.12 g of 2,6-di-t-butyl-p-cresol, 2.4 g of 2,2'-dimethoxyphenyl acetophenone and 12 g of glycerol monomethacrylate, thereby obtaining a uniform transparent polymer.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 8.0% and 19.3%.

EXAMPLE 7

39.4 g of the sulfonic acid group-containing polyester diol having terminal hydroxyl groups and having a number average molecular weight of 787 obtained in Example 6 and 122.0 g of polybutadiene diol having a number average molecular weight of 2,439 (Poly bd R-45HT produced by Idemitsu Sekiyukagaku K.K., Japan) are charged into a 2,000 ml-volume separable flask provided with a stirrer, an inlet for nitrogen gas and an outlet for a distillate, and 1,020 g N-methyl pyrrolidone is added thereto, followed by heating to 130° C. while stirring. To the resultant solution are dropwise added 16.8 g of hexamethylene diisocyanate and 0.3 g of dibutyltin laurate and reacted at 130° C. for 5 hours. After the reaction, N-methyl pyrrolidone is removed by distillation, thereby obtaining a slightly brown polyurethane polymer.

Subsequently, 72 g of the thus obtained polymer is kneaded by a kneader at 150° C. in an atmosphere of nitrogen together with 36 g of a maleate of polybutadiene diol (Poly bd R-45MA manufactured by Idemitsu Sekiyukagaku K.K., Japan), 0.12 g 2,6-di-t-butyl-p-cresol, 2.4 g of 2,2'-dimethoxyphenyl acetophenone and 12 g of nonylphenoxy polyethylene glycol acrylate (Aronics M111 produced by Toa Gosei K.K., Japan), thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, developmentat 60° C. for 60 minutes, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The 1. The swelling ratios in water and isopropanol are, respectively, 6.3% and 15.4%.

EXAMPLE 8

113.8 g of polybutadiene having terminal hydroxyl groups and having a number average molecular weight of 2,276 (G-2000 produced by Nippon Soda Co., Ltd., Japan), 12.6 g of polyethylene glycol having a number average molecular weight of 631, 0.06 g of 2,6-di-t-butyl-4-methylphenol and 0.13 g of N,N'-hexamethylene-bis(3,5-di-t-butyl-4-hydroxy cinnamic acid amide) (Irganox 1098 produced by CIBA Geigy AG) are charged into a 2,000 ml-volume separable flask provided with a stirrer, an inlet for nitrogen gas and an outlet for a distillate, and the resultant mixture is heated to 100° C. Then, 17.6 g of hexamethylene diisocyanate is added thereto and reaction is conducted for 4 hours, thereby forming a light yellow polymer of a polybutadiene derivative having terminal isocyanate groups and in which polyethylene glycol is linked through a urethane bond.

Subsequently, 27.5 g of polyester diol having terminal hydroxyl groups and having a number average molecular weight of 787, obtained in Example 6 is charged into the above reaction mixture and 156 g of N-methyl pyrrolidone is added thereto, followed heating to 130° C. while stirring. Further, 0.15 g of dibutyltin laurate is dropwise added to the resultant solution and then reaction is conducted for 5 hours at 130° C. After the reaction, N-methyl pyrrolidone is removed by distillation, thereby obtaining a slightly yellowish polyurethane polymer. 72 g of the thus obtained polymer is kneaded by a kneader at 150° C. in an atmosphere of nitrogen together with 36 g of α,ω-polybutadiene dicarboxylic acid (C-1000 produced by Nippon Soda Co., Ltd., Japan), 0.12 g of 2,6-di-t-butyl-p-cresol, 2.4 g of 2,2'-dimethoxyphenyl acetophenone and 12 g of nonylphenoxy polyethylene glycol acrylate (Aronics M111 produced by Toa Gosei K.K., Japan), thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development at 60° C. for 60 minutes, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 15.3% and 19.0%.

EXAMPLE 9

148.1 g of sodium 3,5-dicarboxy methylbenzenesulfonate, 150 g of triethylene glycol, 0.30 g of N,N'-hexamethylene-bis(3,5-di-t-butyl-4-hydroxy cinnamic acid amide) (Irganox 1098 produced by CIBA Geigy AG) and 0.30 g of zinc acetate are charged into a 1,000 ml-volume separable flask provided with a stirrer, an inlet for nitrogen gas and an outlet for a distillate, and the resultant mixture is reacted at 220° C. for 4 hours in an atmosphere of nitrogen. After that period, unreacted polyethylene glycol is removed by distillation under a reduced pressure, thereby obtaining a light yellow polymer of sulfonic acid group-containing polyester diol having terminal hydroxyl groups. The sulfonic acid group-containing polyester diol has a number average of molecular weight of 820 as calculated based on the hydroxyl value.

Subsequently, 41.0 g of the above-obtained sulfonic acid group-containing polyester diol having terminal hydroxyl groups, 113.8 g of polybutadiene (G-2000 produced by Nippon Soda Co., Ltd., Japan) having hydroxyl groups at both terminals and having a number average molecular weight of 2,276, and 0.05 g of 2,6-di-t-butyl-4-methylphenol are charged into a 2,000 ml-volume separable flask provided with a stirrer, an inlet for nitrogen gas and an outlet for a distillate, and 685.6 g of N-methyl pyrrolidone is added thereto, followed by heating to 130° C. while stirring. Then, 0.3 g of dibutyltin dilaurate is added thereto, and reaction is carried out at 130° C. for 4 hours while dropwise adding 16.8 g of hexamethylene diisocyanate. After that period, N-methyl pyrrolidone is removed by distillation under a reduced pressure, thereby obtaining a light yellow polyurethane polymer.

72 g of the thus obtained polymer is kneaded by a kneader at 150° C. in an atmosphere of nitrogen together with 36 g of α,ω-polybutadiene dicarboxylic acid (C-1000 produced by Nippon Soda Co., Ltd., Japan), 0.12 g of 2,6-di-t-butyl-p-cresol, 2.4 g of 2,2'-dimethoxyphenyl acetophenone and 12 g of nonylphenoxy polyethylene glycol (Aronics M111 produced by Toa Gosei K.K., Japan), thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development at 60° C. for 60 minutes, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 8.1% and 18.3%.

EXAMPLE 10

41.0 g of the sulfonic acid group-containing polyester diol having terminal hydroxyl groups and having a number average molecular weight of 820 obtained in Example 9 and 148.0 g of hydrogenated polybutadiene diol having a number average molecular weight of 1,480 (GI-1000 produced by Nippon Soda Co., Ltd., Japan) are charged into a 2,000 ml-volume separable flask provided with a stirrer, an inlet for nitrogen gas and an outlet for a distillate, and 1,020 g of N-methyl pyrrolidone is added, followed by heating to 130° C. while stirring. Then, 26.1 g of tolylene diisocyanate is dropwise added and reacted at 130° C. for 5 hours. After the reaction, N-methyl pyrrolidone is removed by distillation, thereby obtaining a slightly brown polyurethane polymer.

72 g of the thus obtained polymer is kneaded by a kneader at 150° C. in an atmosphere of nitrogen together with 36 g of a maleate of polybutadiene diol (Poly bd R-45MA manufactured by Idemitsu Sekiyukagaku K.K., Japan), 0.12 g of 2,6-di-t-butyl-p-cresol, 2.4 g of 2,2'-dimethoxyphenyl acetophenone and 12 g of glycerol monomethacrylate, thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development at 60° C. for 60 minutes, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 6.2% and 9.5%.

EXAMPLE 11

41.0 g of the sulfonic acid group-containing polyester diol having terminal hydroxyl groups and having a number average molecular weight of 820 obtained in Example 9 and 243.9 g of polybutadiene diol having a number average molecular weight of 2,439 (Poly bd R-45HT produced by Idemitsu Sekiyukagaku K.K., Japan) are charged into a 2,000 ml-volume separable flask provided with a stirrer, an inlet for nitrogen gas and an outlet for a distillate, and 1,020 g of N-methyl pyrrolidone is added thereto, followed by heating to 130° C. while stirring. Then, 26.1 g of tolylene diisocyanate is dropwise added and reacted at 130° C. for 5 hours. After the reaction, N-methyl pyrrolidone is removed by distillation, thereby obtaining a lightly brown polyurethane elastomer.

72 g of the thus obtained elastomer is kneaded by a kneader at 150° C. in an atmosphere of nitrogen together with 36 g of a maleate of polybutadiene diol (Poly bd R-45MA produced by Idemitsu Sekiyukagaku K.K., Japan), 0.12 g of 2,6-di-t-butyl-p-cresol, 2.4 g of 2,2'-dimethoxyphenyl acetophenone and 12 g of glycerol monomethacrylate, thereby obtaining a uniform transparent composition.

Using the thus obtained composition, a transparent shaped plate having a thickness of 2 mm and having a 100-μm thick polyester film attached by an adhesive, is produced in substantially the same manner as in Example 1. Then, the shaped plate is subjected to exposure, development at 60° C. for 60 minutes, drying and post-exposure, thereby obtaining a relief printing plate. When printing is performed using the thus prepared relief printing plate fitted on a rotary flexographic press, sharp impressions are produced with little broadening of the image, indicating that the printing plate is excellent in ink receptivity, ink transferability, printing resistance and image resolution.

From the photosensitive resin composition mentioned above, a shaped plate material having a 0.5 mm-thick transparent photosensitive layer disposed on a 100 μm-thick polyester film is prepared and subjected to measuring of swelling ratios in water and isopropanol in the manner as described in Example 1. The swelling ratios in water and isopropanol are, respectively, 5.8% and 9.6%.

What is claimed is:

1. A sulfonic acid group-containing polyurethane produced from:
    (a) at least one diol selected from the group consisting of a sulfonic acid group-containing polyamide diol and a sulfonic acid group-containing polyester diol;
    (b) a dihydroxyhydrocarbon having a number average molecular weight of from 400 to 4,000; and
    (c) a diisocyanate,
    wherein the molar ratio of the isocyanate groups of said diisocyanate (c) to the sum of the hydroxyl groups of said diol (a) and said dihydroxyhydrocarbon (b) is in the range of from 0.6 to 1.3, and said sulfonic acid group-containing polyurethane is a thermoplastic elastomer.

2. The polyurethane according to claim 1, wherein said diol (a) is a sulfonic acid group-containing polyamide diol obtained by reacting a polyamide having terminal carboxyl groups, produced from (1) a polyamide-forming monomer and (2) a dicarboxylic acid or a derivative thereof, with (3) at least one diol selected from the group consisting of an alkylene glycol having 2 to 4 carbon atoms and a polyoxyalkylene glycol having a number average molecular weight of less than 400, a portion or the entire amount of reactants (1) and (2) containing a sulfonic acid group in the molecule thereof.

3. The polyurethane according to claim 2, wherein said polyamide-forming monomer (1) is an aminocarboxylic acid, a lactam having at least 6 carbon atoms or an equimolar salt of a dicarboxylic acid and a diamine, said salt having at least 6 carbon atoms.

4. The polyurethane according to claim 1, wherein said diol (a) is a sulfonic acid group-containing polyester diol produced from (2) a dicarboxylic acid or a derivative thereof and (3) at least one diol selected from the group consisting of an alkylene glycol having 2 to 4 carbon atoms and a polyoxyalkylene glycol having a number average molecular weight of less than 400, a portion or the entire amount of reactant (2) containing a sulfonic acid group in the molecule thereof.

5. The polyurethane according to claim 1, wherein said dihydroxyhydrocarbon (b) is a polymer compound obtained by introducing hydroxyl groups into terminal groups of a polymer of an olefin or a diolefin, or a hydrogenation product of said polymer compound.

6. The polyurethane according to claim 5, wherein said polymer compound is a homopolymer of an olefin or a diolefin.

7. The polyurethane according to claim 5, wherein said polymer compound is a copolymer of an olefin or a diolefin with a comonomer.

8. The polyurethane according to claim 1, wherein said diisocyanate (d) is tolylene diisocyanate, diphenylmethane-4,4'-diisocyanate, hexamethylene diisocyanate, naphthylene-1,5-diisocyanate, xylylene diisocyanate, isophorone diisocyanate, dicyclohexylisocyanate or hydrogenated xylylene diisocyanate.

9. The polyurethane according to claim 8, wherein the isocyanate groups of said diisocyanate (d) are protected with a lactam, a phenol or a lower alcohol.

10. A photosensitive resin composition comprising:
(A) a sulfonic acid group-containing polyurethane produced from:
(a) at least one diol selected from the group consisting of a sulfonic acid group-containing polyamide diol and a sulfonic acid group-containing polyester diol;
(b) a dihydroxyhydrocarbon having a number average molecular weight of from 400 to 4,000; and
(c) a diisocyanate,
wherein the molar ratio of the isocyanate groups of said diisocyanate (c) to the sum of the hydroxyl groups of said diol (a) and said dihydroxyhydrocarbon (b) is in the range of from 0.6 to 1.3, and
said sulfonic acid group-containing polyurethane is a thermoplastic elastomer;
(B) an ethylenically unsaturated compound; and
(C) a photopolymerization initiator,
wherein the weight ratio of component (B) to component (A) is in the range of from 5/100 to 200/100, and the weight ratio of component (C) to component (A) is in the range of from 0.1/100 to 30/100.

11. The photosensitive resin composition according to claim 10, which is a shaped plate having a thickness of from 0.1 to 10 mm.
said shaped plate being for use as a photosensitive plate material for producing a flexographic printing plate.

12. A flexographic printing plate produced from the photosensitive resin composition of claim 11.

13. The polyurethane according to claim 1, wherein said molar ratio of the isocyanate groups of said diisocyanate (c) to the sum of the hydroxyl groups of said diol (a) and said dihydroxyhydrocarbon (b) is in the range of from 0.70 to 1.10.

14. The photosensitive resin composition according to claim 10, wherein said molar ratio of the isocyanate groups of said diisocyanate (c) to the sum of the hydroxyl groups of said diol (a) and said dihydroxyhydrocarbon (b) is in the range of from 0.70 to 1.10.

* * * * *